(12) United States Patent
Kim

(10) Patent No.: US 12,103,459 B2
(45) Date of Patent: Oct. 1, 2024

(54) METHOD AND SYSTEM FOR DISPLAYING EXTERNAL COMMUNICATION MESSAGE

(71) Applicant: HYUNDAI MOBIS CO., LTD., Seoul (KR)

(72) Inventor: Kyung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 14 days.

(21) Appl. No.: 18/066,357

(22) Filed: Dec. 15, 2022

(65) Prior Publication Data
US 2023/0249614 A1 Aug. 10, 2023

(30) Foreign Application Priority Data
Feb. 8, 2022 (KR) .................. 10-2022-0016220

(51) Int. Cl.
*B60Q 1/50* (2006.01)
*H04W 4/46* (2018.01)

(52) U.S. Cl.
CPC ............ *B60Q 1/535* (2022.05); *B60Q 1/545* (2022.05); *B60Q 1/547* (2022.05); *H04W 4/46* (2018.02); *B60Q 2400/50* (2013.01)

(58) Field of Classification Search
CPC ........ B60Q 1/535; B60Q 1/547; B60Q 1/545; B60Q 2400/50; H04W 4/46
See application file for complete search history.

(56) References Cited

U.S. PATENT DOCUMENTS

| 7,554,573 | B2 * | 6/2009 | Mizusawa | B60R 1/26 701/538 |
| 7,860,626 | B2 * | 12/2010 | Breed | B60R 21/01534 180/271 |
| 8,818,647 | B2 * | 8/2014 | Breed | B60N 2/002 701/538 |
| 9,987,979 | B2 * | 6/2018 | Kawamata | B60Q 1/50 |
| 2006/0282204 | A1 * | 12/2006 | Breed | G01G 23/3728 701/49 |
| 2007/0159317 | A1 * | 7/2007 | Nagata | B60R 1/30 340/461 |
| 2008/0276191 | A1 * | 11/2008 | Breed | B60N 2/002 715/764 |
| 2011/0032357 | A1 * | 2/2011 | Kitaura | H04N 7/18 348/148 |
| 2015/0224926 | A1 * | 8/2015 | Mochizuki | G06V 20/588 701/36 |
| 2015/0232031 | A1 * | 8/2015 | Kitaura | G06T 5/80 348/148 |
| 2017/0253177 | A1 * | 9/2017 | Kawamata | G08G 1/005 |
| 2017/0255093 | A1 * | 9/2017 | Fujita | G01S 13/931 |
| 2018/0186283 | A1 * | 7/2018 | Fischer | G07C 5/008 |
| 2018/0297470 | A1 * | 10/2018 | Kim | G08G 1/166 |
| 2019/0016252 | A1 * | 1/2019 | Waragaya | F21S 41/663 |
| 2019/0118705 | A1 * | 4/2019 | Yu | G05D 1/0088 |

(Continued)

*Primary Examiner* — Hoi C Lau
(74) *Attorney, Agent, or Firm* — NovoTechIP International PLLC

(57) ABSTRACT

A method for displaying an external communication message includes determining an external communication message display situation via environmental information of a surrounding of a vehicle, generating the external communication message based on the determined situation, and scanning the generated external communication message.

19 Claims, 18 Drawing Sheets

(56) References Cited

U.S. PATENT DOCUMENTS

| | | | | |
|---|---|---|---|---|
| 2020/0231085 | A1* | 7/2020 | Kunii | B60Q 1/54 |
| 2021/0053483 | A1* | 2/2021 | Takeyasu | G06V 10/141 |
| 2021/0065538 | A1* | 3/2021 | Tamura | G06V 40/20 |
| 2021/0188159 | A1* | 6/2021 | Fukutaka | B60Q 1/46 |
| 2021/0254806 | A1* | 8/2021 | Choi | B60Q 1/549 |
| 2021/0370823 | A1* | 12/2021 | Stein | B60Q 1/525 |
| 2021/0382379 | A1* | 12/2021 | Lachaumette | G09F 19/18 |
| 2022/0048429 | A1* | 2/2022 | Verbeke | B60Q 1/507 |
| 2022/0379806 | A1* | 12/2022 | Spoor | B60Q 1/0023 |
| 2023/0249614 | A1* | 8/2023 | Kim | B60Q 1/545 |
| | | | | 340/468 |
| 2023/0271548 | A1* | 8/2023 | Shibata | B60Q 1/50 |
| | | | | 340/468 |
| 2024/0005795 | A1* | 1/2024 | Jiang | B60Q 1/525 |
| 2024/0010122 | A1* | 1/2024 | Nagata | B60Q 1/444 |
| 2024/0034358 | A1* | 2/2024 | Grard | B60W 60/0011 |

\* cited by examiner

METHOD AND SYSTEM FOR DISPLAYING EXTERNAL COMMUNICATION MESSAGE

CROSS-REFERENCE TO RELATED APPLICATIONS

Pursuant to 35 U.S.C. § 119(a), this application claims the benefit of Korean Patent Application No. 10-2022-0016220, filed on Feb. 8, 2022, which is hereby incorporated by reference as if fully set forth herein.

TECHNICAL FIELD

The present disclosure relates to a method and a system for displaying an external communication message, and more particularly, to a method and a system for variably displaying an external communication message depending on a target for whom information is to be transmitted via a projector of a vehicle.

BACKGROUND

A vehicle is a machine that travels on a road by driving wheels, and the vehicle is equipped with various devices for user protection, driving assistance, and improvement of riding comfort.

When the vehicle is inevitably parked or stopped on the road because of vehicle breakdown or the like, a driver installs a warning sign at the rear of the vehicle so as to be recognized by other drivers.

However, most drivers do not have such warning sign in their vehicles, so that there was no way for most drivers to properly report locations of the vehicles thereof at night. In addition, the warning sign is installed on the road directly by the driver, and in this case, there is a risk that the driver is exposed to a vehicle in motion. In addition, there is a problem that the warning sign is small in size, so that a driver approaching from the rear is not able to easily recognize the sign. Such problem becomes more serious as a reflectivity of the warning board is poor.

As a result, a secondary accident in which another vehicle collides with the vehicle parked on the road because of the breakdown or the like occurs frequently. A mortality rate of such secondary accident is several times higher than that of an ordinary accident, which is fatal.

In order to solve such problem, a system that reports the location of the vehicle performs a function of determining and outputting a vehicle's situation. However, recently, in addition to such function, a need for a technology to output a message for external communication in response to a surrounding situation of the vehicle is emerging.

SUMMARY

In order to solve the problem as described above, one aspect of the present disclosure is to provide a method for displaying an external communication message and a system therefor that determine a target for whom an image is to be displayed via an external sensor of a vehicle, and differently display information for a passenger, a pedestrian, and another vehicle via a projector of the vehicle.

The problems to be solved in the present disclosure are not limited to the technical problems mentioned above, and other technical problems not mentioned will be clearly understood by those of ordinary skill in the technical field to which the present disclosure belongs from the description below.

In one aspect of the present disclosure for solving the above-described problem, a method for displaying an external communication message includes determining an external communication message display situation via environmental information (i.e., sensing information) of a surrounding of a vehicle, generating the external communication message based on the determined situation, and scanning the generated external communication message.

According to an embodiment, the determining of the external communication message display situation includes determining an external object of the vehicle as at least one of a target and a vehicle based on the environmental information of the vehicle, and determining the external communication message display situation based on the determined object.

According to an embodiment, the determining of the external communication message display situation based on the determined object includes determining the external object of the vehicle as the target, and determining a current situation as the external communication message display situation of at least one of a situation where a scanning surface in front of the vehicle is sensed or a situation where a pedestrian is sensed based on the determined external object.

According to an embodiment, the generating of the external communication message based on the determined situation includes measuring a distance and an angle between the scanning surface in front of the vehicle and the vehicle when the external communication message display situation is the situation where the scanning surface in front of the vehicle is sensed, determining a passenger's viewing angle of the vehicle, determining a state of the scanning surface in front of the vehicle, calculating a degree of distortion of an image based on the state of the scanning surface in front of the vehicle, and correcting a message to be scanned in front of the vehicle corresponding to the calculated degree of distortion of the image so as to generate the external communication message.

According to an embodiment, the generating of the external communication message based on the determined situation includes determining a state of the pedestrian based on a direction of a head and a face of the pedestrian when the external communication message display situation is the situation where the pedestrian is sensed, determining a state of a road surface where the external communication message is to be scanned based on the state of the pedestrian, calculating a degree of distortion of an image based on the state of the pedestrian, and correcting a pedestrian message corresponding to the calculated image degree of distortion of the image so as to generate the external communication message.

According to an embodiment, the determining of the external communication message display situation based on the determined object includes determining the external object of the vehicle as the vehicle, and determining a current situation as the external communication message display situation of at least one of a situation where high beams of an opposite vehicle are sensed, a situation where a following vehicle is sensed, and a situation where a laterally following vehicle is sensed based on the determined external object.

According to an embodiment, the generating of the external communication message based on the determined situation includes determining a distance from the opposite vehicle and a speed of the opposite vehicle when the external communication message display situation is the situation where the high beams of the opposite vehicle are sensed, determining a state of a road surface where the external communication message is to be scanned based on the distance from the opposite vehicle and the speed of the opposite vehicle, determining an eye level of a driver of the opposite vehicle, calculating a degree of distortion of an image based on the distance from the opposite vehicle and the speed of the opposite vehicle, and the eye level of the driver, and correcting a message for the opposite vehicle corresponding to the calculated degree of distortion of the image so as to generate the external communication message.

According to an embodiment, the generating of the external communication message based on the determined situation includes determining a distance from the laterally following vehicle and a speed of the laterally following vehicle when the external communication message display situation is the situation where the laterally following vehicle is sensed, determining a state of a road surface where the external communication message is to be scanned based on the distance from the laterally following vehicle and the speed of the laterally following vehicle, determining a viewing angle of a driver of the laterally following vehicle, calculating a degree of distortion of an image based on the distance from the laterally following vehicle and the speed of the laterally following vehicle, and the viewing angle of the driver, and correcting a message for the laterally following vehicle corresponding to the calculated degree of distortion of the image so as to generate the external communication message.

According to an embodiment, the generating of the external communication message based on the determined situation includes determining a distance from the following vehicle and a speed of the following vehicle when the external communication message display situation is the situation where the following vehicle is sensed, determining a state of a road surface where the external communication message is to be scanned based on the distance from the following vehicle and the speed of the following vehicle, determining a viewing angle of a driver of the following vehicle, calculating a degree of distortion of an image based on the distance from the following vehicle and the speed of the following vehicle, and the viewing angle of the driver, and correcting a message for the following vehicle corresponding to the calculated degree of distortion of the image so as to generate the external communication message.

According to the embodiments of the present disclosure as described above, a risk of accidents may be effectively reduced by providing safety information for each situation via one projector.

In addition, when the vehicle is stopped, the external projector may be utilized for a convenience function.

Effects that may be obtained from the present disclosure are not limited to the effects mentioned above, and other effects not mentioned will be clearly understood by those of ordinary skill in the technical field to which the present disclosure belongs from the description below.

DETAILED DESCRIPTION

Figure 1:
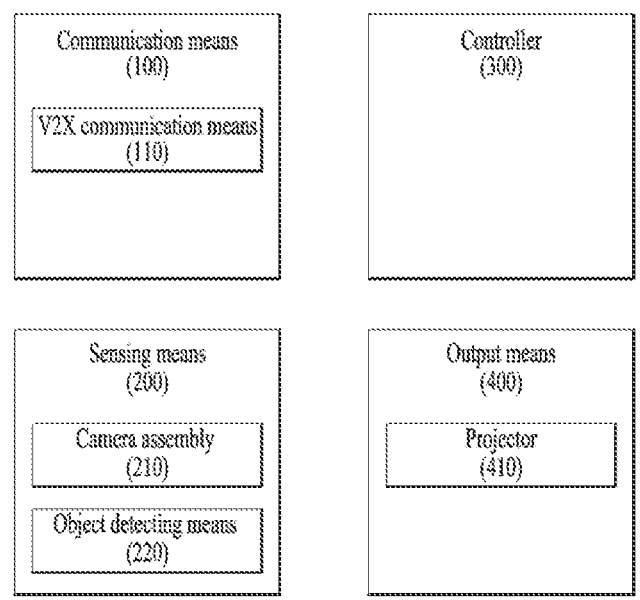
FIG. 1 is a view for illustrating a configuration of a system for displaying an external communication message according to an embodiment of the present disclosure.

Hereinafter, an embodiment of the present disclosure will be described in detail with reference to the accompanying drawings such that a person having ordinary knowledge in the technical field to which the present disclosure belongs may easily implement the present disclosure. However, the present disclosure may be implemented in several different forms, and the present disclosure may not be limited to the embodiment described herein. In addition, in order to clearly illustrate the present disclosure, components irrelevant to the description are omitted in the drawings, and like reference numerals are assigned to like components throughout the specification.

Throughout the specification, when one component "includes" a certain component, this means that other components may be further included, rather than excluding other components, unless otherwise stated.

FIG. 1 is a view for illustrating a configuration of a system for displaying an external communication message according to an embodiment of the present disclosure.

First, as shown in FIG. 1, the system for displaying the external communication message according to the present embodiment may include communication means (or a communication unit) 100, sensing means (or sending unit) 200, a controller 300, and output means (or output unit) 400.

The communication means 100 may include V2X communication means 110. According to an embodiment, the communication means 100 may further include other components in addition to components to be described, or may not include some of the components to be described.

The V2X communication means 110 is a unit for performing wireless communication with a server (V2I: Vehicle to Infra) or another vehicle (V2V: Vehicle to Vehicle). The V2X communication means 110 may perform the vehicle to infra communication (V2I) and the vehicle-to-vehicle communication (V2V).

The communication means 100 may perform communication for identifying a target vehicle to be parked together among a plurality of unspecified vehicles in order to identify a target vehicle for whom the external communication message is to be displayed.

The communication means 100 may transmit and receive data between vehicles via the V2V in an online state. The communication means 100 may transmit and receive the data between the vehicles via short-distance communication in an offline state.

The sensing means 200 may include a camera assembly 210 composed of a plurality of cameras and object detecting means (or object detecting unit) 220.

The camera assembly 210 may include a front camera that shoots an image of a region ahead of a vehicle, a left camera that shoots an image of a region on a left side of the vehicle, a right camera that shoots an image of a region on a right side of the vehicle, and a rear camera that shoots an image of a region at the rear of the vehicle. The image of the region ahead of the vehicle, the image of the region on the left side of the vehicle, the image of the region on the right side of the vehicle, and the image of the region at the rear of the vehicle may be received from the front camera, the left camera, the right camera, and the rear camera, respectively.

Each camera of the camera assembly 210 may include an image sensor and an image processing module. Each camera is capable of processing a still image or a moving image obtained by the image sensor (e.g., a CMOS or a CCD). The image processing module may process the still image or the moving image obtained via the image sensor so as to extract necessary information.

The object detecting means 220 is a device for detecting an object located outside the vehicle. The object may include various objects related to driving of the vehicle. The object detecting means 220 may detect an obstacle around the vehicle.

The object detecting means 220 may include a radar, a lidar, an ultrasonic sensor, an infrared sensor, and the like.

The object detecting means 220 may detect and track the object. The object detecting means 220 may process sensing data of each sensor via a data processing algorithm so as to detect a type of object, a location of the object, a distance to the object, and the like.

The controller 300 may determine the target for whom the external communication message is displayed. The controller 300 may determine the external object and the external vehicle via the sensing means 200. The controller 300 may determine the target for whom the external communication message is displayed based on the external object and the external vehicle.

The controller 300 may determine a target for whom an image is to be displayed via the sensing means 200 of the vehicle.

The target for whom the image is to be displayed may include a passenger, a pedestrian, another vehicle, and the like. In this regard, another vehicle outside the vehicle may include a vehicle located ahead of the vehicle, a vehicle located at the rear of the vehicle, and a vehicle located on a rear lateral side of the vehicle.

When sensing the external object via the sensing means 200, the controller 300 may determine the target for whom the image is to be displayed as at least one of a scanning surface in front of the vehicle and the pedestrian. When the controller 300 determines the target for whom the image is to be displayed in response to the external object, the controller 300 may determine a situation of the vehicle and control the image to be scanned based on the situation of the vehicle.

The controller 300 may sense another vehicle via the sensing means 200 and determine a travel situation of the vehicle.

The controller 300 may control the vehicle to scan the image to another vehicle via communication with said another vehicle.

The controller 300 may output information corresponding to the situation to another vehicle via the output means 400.

In this regard, the controller 300 may identify road surface information, the pedestrian, and said another vehicle via the sensing means 200 and the communication means, and control the corresponding information to be displayed in an optimal format to be read.

For example, when the target for whom the image is to be displayed is the scanning surface in front of the vehicle, the controller 300 may control the information to be displayed by being subjected to adjustment (e.g., keystone correction) in accordance with a viewing angle of the vehicle's passenger based on a distance and an angle between the vehicle and a wall with a front surface where the image is focused.

For example, when the target for whom the image is to be displayed is the pedestrian, the controller 300 may search for a head and a face of the pedestrian via a camera outside the vehicle, scan a road surface, and display the information by performing the keystone correction in a form of a standing message signboard for the pedestrian.

For example, when the target for whom the image is to be displayed is an opposite vehicle, and high beams of the opposite vehicle are turned on, the controller 300 may display high beam lighting indication message information by avoiding a gaze of a driver of the opposite vehicle.

For example, when the target for whom the image is to be displayed is a following vehicle, the controller 300 may calculate a speed of the following vehicle and a spacing from the following vehicle via an external sensor of the vehicle, and may display the information by performing the keystone correction on the message signboard based on a viewing angle of the following vehicle's driver in real time.

For example, when the target for whom the image is to be displayed is a laterally following vehicle, the controller 300 may calculate a speed of the laterally following vehicle and a spacing from the laterally following vehicle via the external sensor of the vehicle, and may display the information by performing the keystone correction on the message signboard based on a viewing angle of the laterally following vehicle's driver in real time.

The output means 400 may include a projector. The projector may be configured to project an image or a message to the road surface of the vehicle or a space corresponding to a surrounding environment in a stopped state of a traveling state of the vehicle, so that the vehicle's passenger, the pedestrian, and a driver of an external vehicle recognize external communication.

The projector may be disposed at a front portion and a rear portion of the vehicle to output the message to the region ahead of and at the rear of the vehicle. The projector may have an axially-rotatable lens shift structure. Therefore, the projector may minimize degradation of an image quality of the message output from the vehicle.

Figure 2:
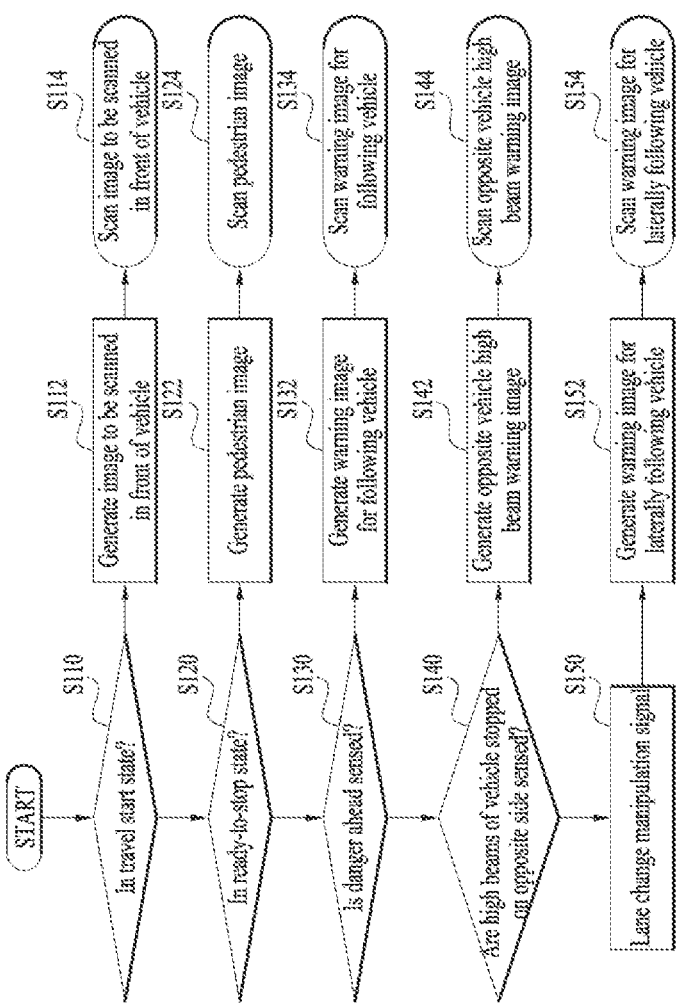
FIG. 2 is a flowchart of a method for displaying an external communication message for each target according to an embodiment of the present disclosure.

FIG. 2 is a flowchart of a method for displaying an external communication message for each target according to an embodiment of the present disclosure.

Referring to FIG. 2, the controller 300 may determine whether the vehicle is in a travel start state (S110).

After the step S110, when the vehicle is not in the travel start state, the controller 300 may generate an image to be scanned in front of the vehicle (S112). Thereafter, the controller 300 may control the generated image to be scanned in front of the vehicle to be scanned(S114).

After the step S110, when the vehicle is in the travel start state, the controller 300 may determine whether the vehicle is in a ready-to-stop state (S120).

After the step S120, when the vehicle is in the ready-to-stop state, the controller 300 may generate a pedestrian message (S122). Thereafter, the controller 300 may control the generated pedestrian message to be scanned (S124).

After the step S120, when the vehicle is not in the ready-to-stop state, the controller 300 may determine whether a danger ahead is sensed (S130).

After the step S130, when the vehicle senses the danger ahead, the controller 300 may generate a warning message for the following vehicle (S132). Thereafter, the controller 300 may scan the generated warning message for the following vehicle (S134).

After the step S140, when the vehicle does not sense the danger ahead, the controller 300 may determine whether high beams of a vehicle stopped on an opposite side are sensed (S140).

After the step S140, when the vehicle senses the high beams of the vehicle stopped on the opposite side, the controller 300 may generate an opposite vehicle high beam warning message (S142). Thereafter, the controller 300 may scan the generated opposite vehicle high beam warning message (S144).

After the step S140, when the vehicle does not sense the high beams of the vehicle stopped on the opposite side, the controller 300 may receive a lane change manipulation signal (S150).

After the step S150, when receiving the lane change signal, the controller 300 may generate a warning message for the laterally following vehicle (S152). Thereafter, the controller 300 may scan the generated warning message for the laterally following vehicle (S154).

Figure 3:
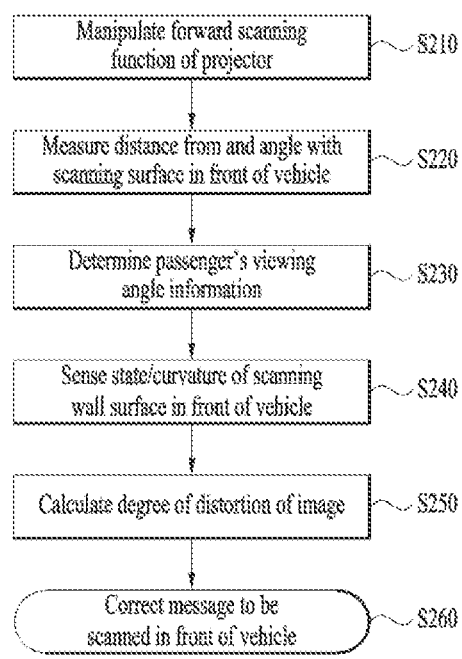
FIG. 3 is a flowchart for illustrating a method for generating an image to be scanned in front of a vehicle according to an embodiment of the present disclosure.

FIG. 3 is a flowchart for illustrating a method for generating an image to be scanned in front of a vehicle according to an embodiment of the present disclosure.

Referring to FIG. 3, the controller 300 may receive a signal for manipulating a forward scanning function of the projector from the passenger in the vehicle (S210).

After the step S210, the controller 300 may measure a distance from and an angle with the scanning surface onto which the image to be scanned in front of the vehicle will be scanned via the sensing means 200 (S220).

After the step S220, the controller 300 may determine passenger's viewing angle information via the sensing means 200 (S230).

After the step S230, the controller 300 may sense a state and a curvature of the scanning surface in front of the vehicle via the sensing means 200 (S240).

After the step S240, the controller 300 may calculate a degree of distortion of the image based on the distance from and the angle with the scanning surface in front of the vehicle onto which the image to be scanned in front of the vehicle will be scanned, the passenger's viewing angle, and the state and the curvature of the scanning surface in front of the vehicle (S250).

After the step S250, the controller 300 may adjust (or correct) a message to be scanned in front of the vehicle based on the degree of distortion of the image (S260).

Figure 4:
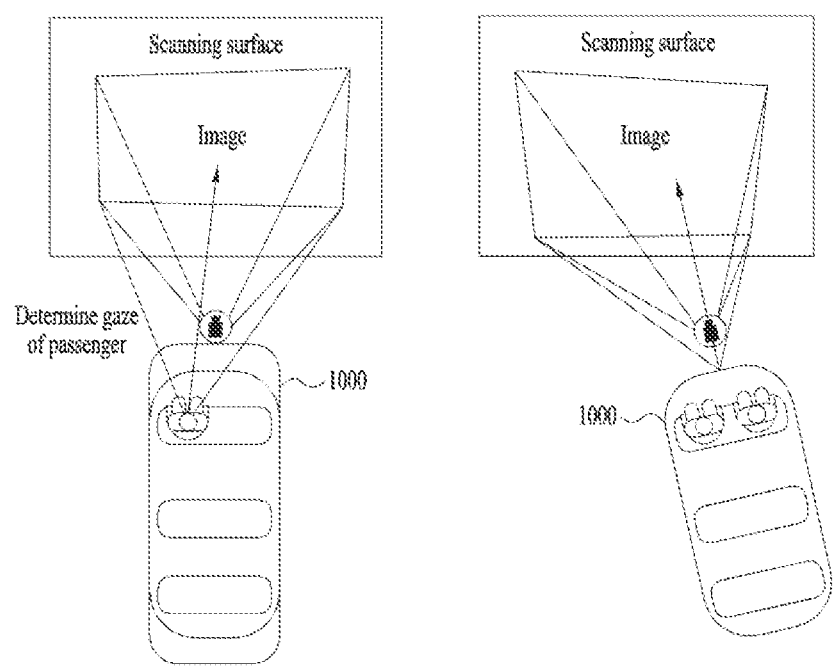
FIG. 4 is a view for illustrating a method for scanning an image to be scanned in front of a vehicle according to an embodiment of the present disclosure.

FIG. 4 is a view for illustrating a method for scanning an image to be scanned in front of a vehicle according to an embodiment of the present disclosure.

Referring to FIG. 4, when a vehicle 1000 scans the image to be scanned in front of the vehicle, after the distance from and the angle with the scanning surface in front of the vehicle are measured, a screen may be adjusted (or corrected) in a form optimized for a gaze of the passenger and the adjusted (or corrected) image may be scanned onto the scanning surface in front of the vehicle.

According to (a) in FIG. 4, when there is one passenger in the vehicle 1000, the vehicle 1000 may perform eye tracking for the corresponding passenger via a camera inside the vehicle 1000 to adjust (or correct) and scan the screen.

According to (b) in FIG. 4, when there are a plurality of passengers, the vehicle 1000 may correct and scan the screen based on a center of a region between the passengers. In this regard, after the distance from and the angle with the scanning surface in front of the vehicle are measured, the screen may be corrected and scanned in the form optimized for the gaze of the passenger.

Figure 5:
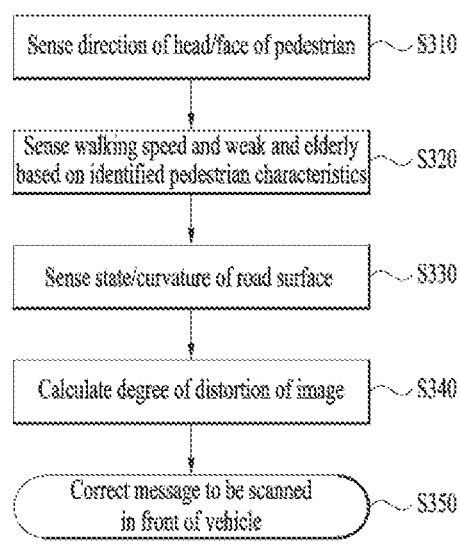
FIG. 5 is a flowchart for illustrating a method for generating a pedestrian message according to an embodiment of the present disclosure.

FIG. 5 is a flowchart for illustrating a method for generating a pedestrian message according to an embodiment of the present disclosure.

Referring to FIG. 5, the controller 300 may sense a direction of a head/face of the pedestrian via an external camera (S310).

After the step S310, the controller 300 may identify pedestrian characteristics based on the sensed direction of the head/face of the pedestrian. Thereafter, the controller 300 may sense a walking speed and the weak and the elderly based on the identified pedestrian characteristics (S320).

After the step S320, the controller 300 may sense the state/curvature of the road surface on which the image is output via the sensing means 200 (S330).

After the step S330, the controller 300 may calculate the degree of distortion of the image based on the state and the curvature of the road surface (S340).

After the step S340, the controller 300 may correct the message to be scanned in front of the vehicle based on the degree of distortion of the image (S350).

Figure 6:
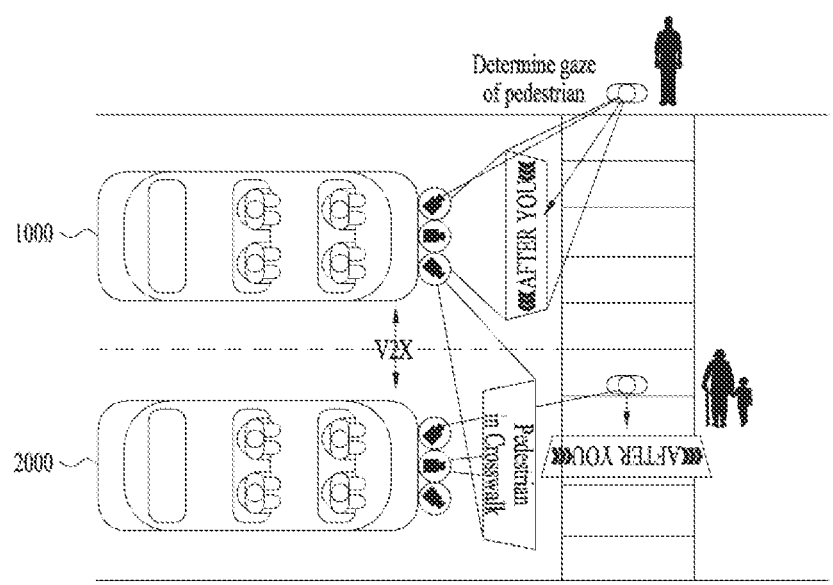
FIG. 6 is a view for illustrating display of a pedestrian message according to an embodiment of the present disclosure.

FIG. 6 is a view for illustrating display of a pedestrian message according to an embodiment of the present disclosure.

Referring to FIG. 6, the vehicle 1000 is stopped in front of a crosswalk, and an external vehicle 2000 is disposed on a side of the vehicle 1000 so as to transmit and receive data to and from the vehicle 1000 via the V2X communication.

The vehicle 1000 may sense the pedestrian outside of the vehicle 1000 via the external camera. The vehicle 1000 may sense the direction of the head and the face of the pedestrian via head & eye tracking on the head and eyes of the pedestrian via the external camera.

The vehicle 1000 may determine whether the pedestrian is weak or old by performing skeleton measurement on the pedestrian so as to measure a height and a size of the pedestrian, and determining the walking speed of the pedestrian. The vehicle 1000 may generate the pedestrian message corresponding to whether the pedestrian is weak or old.

For example, the vehicle 1000 may increase readability of the pedestrian messages via animation deceleration.

For example, the vehicle 1000 may increase a degree of attention via blinking the pedestrian message.

For example, when the pedestrian is not weak or old and has not yet crossed the crosswalk, the pedestrian message may be displayed based on the direction of the head and the face of the pedestrian. When the head and the face of the pedestrian are oriented in a direction of a space between the crosswalk and the vehicle 1000, the vehicle 1000 may display the pedestrian message in the space between the front of the vehicle 1000 and the crosswalk. The pedestrian message may be displayed in reverse with respect to the vehicle 1000 so as to be recognized by the pedestrian. In addition, the pedestrian message with text 'AFTER YOU' of a black color on a white background may be displayed.

For example, when the pedestrian is obscured by a blind spot formed by the vehicle 1000 on the left, a pedestrian movement notification message for informing the external vehicle 2000 of a movement of the pedestrian may be scanned.

As the pedestrian movement notification message, a pedestrian movement message containing text 'Pedestrian in Crosswalk' of the black color on the white background may be displayed. In this regard, the pedestrian movement notification message may be located in the space between the front of the external vehicle 2000 and the crosswalk. The pedestrian movement notification message may be displayed based on the external vehicle 2000 in order for a passenger of the external vehicle 2000 to recognize the pedestrian.

For example, when the pedestrian is weak or old, and passes a space ahead of the external vehicle 2000, the vehicle 1000 may deliver the pedestrian message to the external vehicle 2000 via the V2X communication. The external vehicle 2000 may transmit the pedestrian message received from the vehicle 1000.

When the pedestrian message is a pedestrian message for the weak and the elderly, the pedestrian message may be displayed in a high contrast mode. The pedestrian message in the high-contrast mode may be displayed as a pedestrian message with text 'AFTER YOU' of a yellow color on a black background. The external vehicle 2000 may increase visibility of the pedestrian message via the display in the high-contrast mode.

Figure 7:
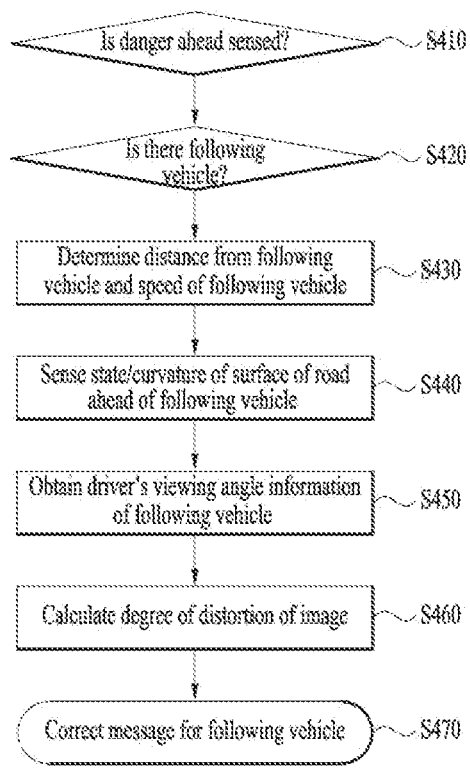
FIG. 7 is a flowchart for illustrating a method for generating a warning message for a following vehicle according to an embodiment of the present disclosure.

FIG. 7 is a flowchart illustrating a method for generating a warning message for a following vehicle 2200 according to an embodiment of the present disclosure.

Referring to FIG. 7, the controller 300 may sense danger ahead of the vehicle 1000 (S410).

After the step S410, the controller 300 may sense whether there is the following vehicle 2200 when sensing the danger ahead of the vehicle 1000 (S420).

After the step S420, when the following vehicle 2200 is present, the controller 300 may determine a distance from the following vehicle 2200 and a speed of the following vehicle 2200 (S430).

After the step S430, the controller 300 may sense, via the sensing means 200, a state/curvature of a surface of a road ahead of the following vehicle 2200 for whom the image is to be displayed (S440).

After the step S440, the controller 300 may receive driver's viewing angle information of the following vehicle 2200 via the sensing means 200 (S450).

After the step S450, the controller 300 may calculate a degree of distortion of the image based on the state and the curvature of the road surface (S460).

After the step S460, the controller 300 may correct the message to be scanned in front of the following vehicle 2200 based on the degree of distortion of the image (S470).

Figure 8:
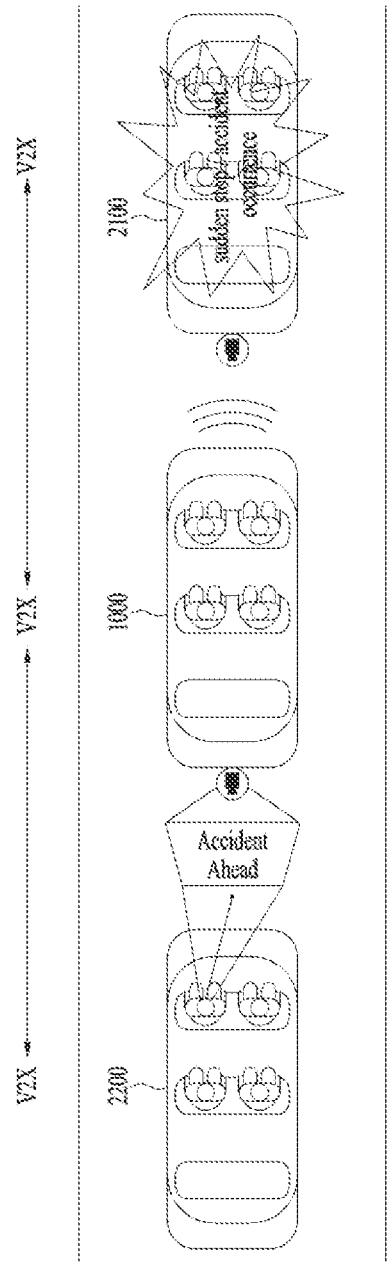
FIG. 8 is a view for illustrating a method for displaying a warning message for a following vehicle of a method for displaying an external communication message for each target via a projector according to an embodiment of the present disclosure.

FIG. 8 is a view for illustrating a method for displaying a warning message for the following vehicle 2200 of a method for displaying an external communication message for each target via a projector according to an embodiment of the present disclosure.

Referring to FIG. 8, the vehicle 1000 may transmit and receive data via the V2X communication with a preceding vehicle 2100 and the following vehicle 2200.

When the preceding vehicle 2100 is suddenly stopped/has an accident, the vehicle 1000 may sense danger of the preceding vehicle 2100.

When sensing the danger of the preceding vehicle 2100, the vehicle 1000 may sense the distance from the following vehicle 2200 and the speed of the following vehicle 2200.

The vehicle 1000 may obtain the driver's viewing angle information of the following vehicle 2200. In addition, the vehicle 1000 may perform the real-time keystone correction via the eye tracking of the driver.

The vehicle 1000 may correct a message for the following vehicle 2200. The vehicle 1000 may display the warning message for the following vehicle 2200. In this regard, as the warning message for the following vehicle 2200, a warning message for the following vehicle 2200 with text 'Accident Ahead' of a white color on a red background may be displayed.

Figure 9:
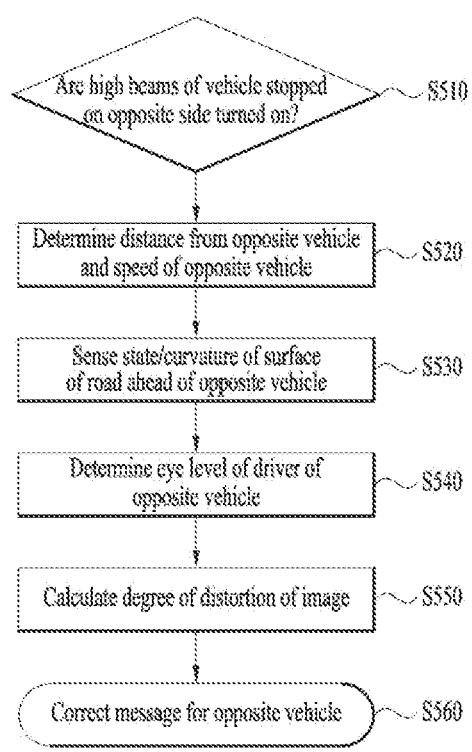
FIG. 9 is a flowchart for illustrating a method for displaying a high beam warning message for a vehicle of a method for displaying an external communication message for each target via a projector according to an embodiment of the present disclosure.

FIG. 9 is a flowchart for illustrating a method for displaying a high beam warning message for the vehicle 1000 of a method for displaying an external communication message for each target via a projector according to an embodiment of the present disclosure.

Referring to FIG. 9, the controller 300 may determine whether high beams of the vehicle 1000 stopped on the opposite side of the road are turned on via the sensing means 200 (S510).

After the step S510, when the high beams of the opposite vehicle 2300 are turned on, the controller 300 may determine a distance from the opposite vehicle 2300 and a speed of the opposite vehicle 2300 (S520).

After the step S520, the controller 300 of the vehicle 1000 may sense a state/curvature of a surface of the road ahead of the opposite vehicle 2300 (S530).

After the step S530, the controller 300 may determine an eye level of a driver of the opposite vehicle 2300 (S540).

After the step S540, the controller 300 may calculate a degree of distortion of an image based on information on the state/curvature of the surface of the road ahead of the opposite vehicle 2300 and information on a driver's viewing angle of the opposite vehicle 2300 (S550).

After the step S550, the controller 300 may correct and scan a high beam warning message for the opposite vehicle 2300 (S560).

Figure 10:
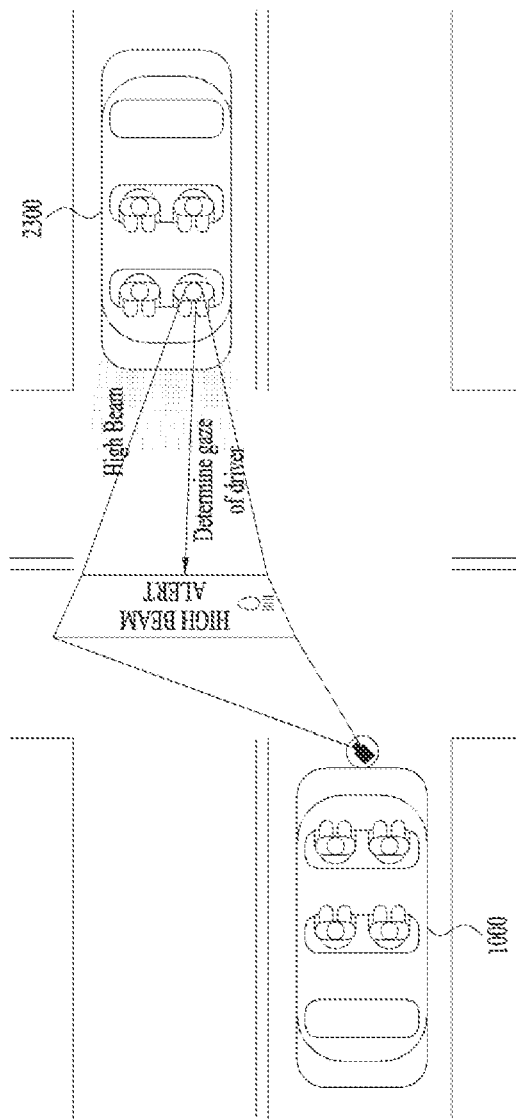
FIGS. 10 and 11 are views for illustrating a method for displaying a high beam warning message for a vehicle of a method for displaying an external communication message for each target via a projector according to an embodiment of the present disclosure.
Figure 11:
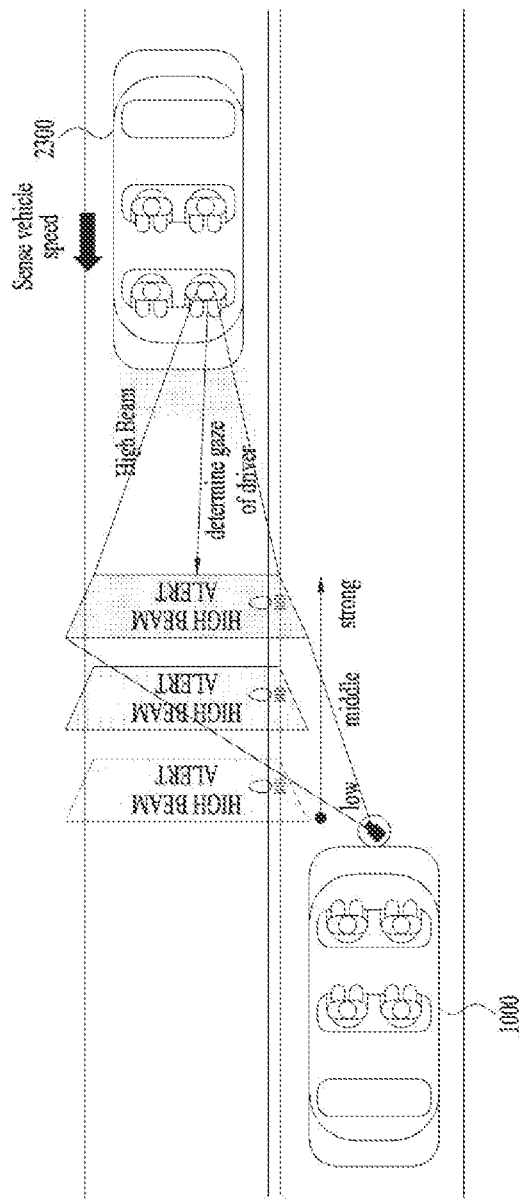

FIGS. 10 and 11 are views for illustrating a method for displaying a high beam warning message for the vehicle 1000 of a method for displaying an external communication message for each target via a projector according to an embodiment of the present disclosure.

Referring to FIG. 10, when the vehicle 1000 is stopped, whether a stopped position of the vehicle 1000 is an intersection may be determined. The vehicle 1000 may determine whether the stopped position is the intersection based on MAP information and V2X communication information.

The vehicle 1000 may determine whether there is a vehicle 1000 stopped on an opposite side of the intersection. When there is the stopped vehicle 1000, the vehicle 1000 may sense the high beams of the opposite vehicle 2300.

When the high beams of the opposite vehicle 2300 are sensed, the vehicle 1000 may determine the distance from the opposite vehicle 2300.

The vehicle 1000 may calculate the degree of distortion of the image based on the information on the state/curvature of the surface of the road ahead of the opposite vehicle 2300 and the eye level of the passenger of the opposite vehicle 2300. The vehicle 1000 may correct and scan the high beam warning message for the opposite vehicle 2300.

For example, when the vehicle 1000 is stopped at the intersection, a high beam warning notification image may be scanned by determining whether the high beams are turned on regardless of ambient illuminance. In this regard, the high beam warning notification message may contain text 'HIGH BEAM ALERT' of the white color on a blue background.

Referring to FIG. 11, when the vehicle 1000 is traveling, the vehicle 1000 may sense the high beams of the traveling opposite vehicle 2300.

The vehicle 1000 may determine the distance from the opposite vehicle 2300 and the speed of the opposite vehicle 2300 when the high beams of the opposite vehicle 2300 are sensed.

The vehicle 1000 may calculate the degree of distortion of the image based on the information on the state/curvature of the surface of the road ahead of the opposite vehicle 2300 and the eye level of the passenger of the opposite vehicle 2300. The vehicle 1000 may correct and scan the high beam warning message for the opposite vehicle 2300. The high beam warning notification message may contain the text 'HIGH BEAM ALERT' of the white color on the blue background.

The vehicle 1000 may adjust an image brightness so as to provide the image to the passenger of the opposite vehicle 2300 as a sudden notification.

The vehicle 1000 may adjust the image brightness in a form with high readability based on the ambient illuminance.

For example, the vehicle 1000 may control a brightness of the high beam warning message scanned to the vehicle 1000 traveling on the opposite side in response to the sensing of the ambient illuminance. The vehicle 1000 may adjust the brightness of the high beam warning message to high when the ambient illuminance is high, and may adjust the brightness of the high beam warning message to low when the ambient illuminance is low.

The vehicle 1000 may control the brightness of the high beam warning message scanned to the vehicle 1000 traveling on the opposite side in response to the distance from the opposite vehicle 2300.

For example, the vehicle 1000 may control the brightness of the message from low to high in response to the distance from the opposite vehicle 2300.

Figure 12:
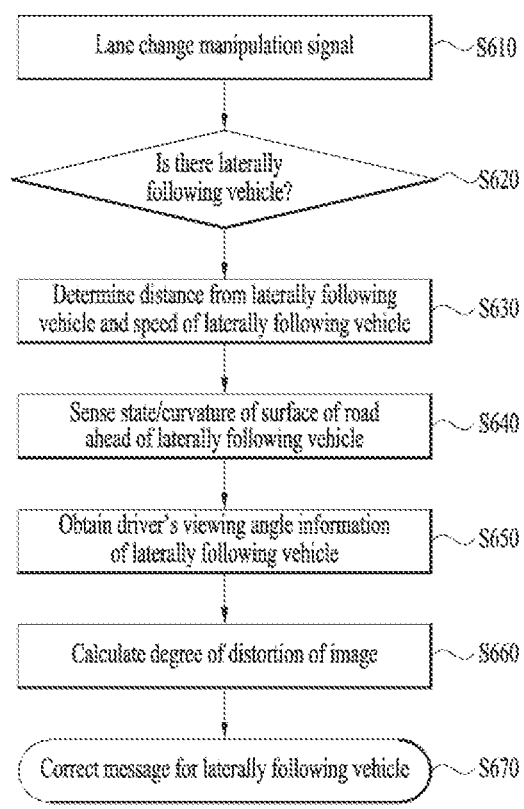
FIG. 12 is a view for illustrating a method for displaying a warning message for a laterally following vehicle of a method for displaying an external communication message for each target via a projector according to an embodiment of the present disclosure.

FIG. 12 is a view for illustrating a method for displaying a warning message for a laterally following vehicle 2400 of a method for displaying an external communication message for each target via a projector according to an embodiment of the present disclosure.

Referring to FIG. 12, the controller 300 may receive a signal in response to the lane change manipulation (S610).

The controller 300 may determine whether there is the laterally following vehicle 2400 via the sensing means 200 (S620).

When the laterally following vehicle 2400 is present, the controller 300 may determine a distance from the laterally following vehicle 2400 and a speed of the laterally following vehicle 2400 (S630).

After the step S630, the controller 300 of the vehicle 1000 may sense a state/curvature of a surface of a road ahead of the laterally following vehicle 2400 (S640).

After the step S640, the controller 300 may receive driver's viewing angle information of the laterally following vehicle 2400 (S650).

After the step S650, the controller 300 may calculate a degree of distortion of an image based on information on the state/curvature of the surface of the road ahead of the opposite vehicle 2300 and the driver's viewing angle information of the laterally following vehicle 2400 (S660).

After the step S660, the controller 300 may correct the warning message for the laterally following vehicle 2400 (S670).

Figure 13:
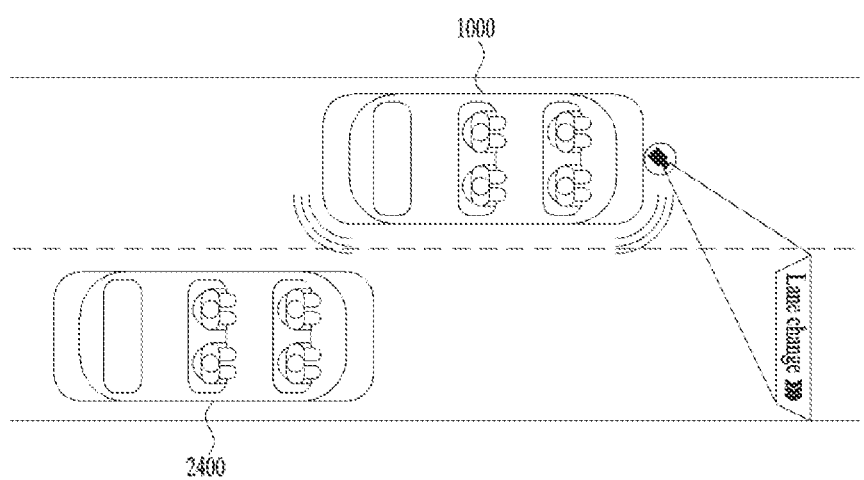
FIGS. 13 and 14 are views for illustrating a method for displaying a warning message for a laterally following vehicle of a method for displaying an external communication message for each target via a projector according to an embodiment of the present disclosure.
Figure 14:
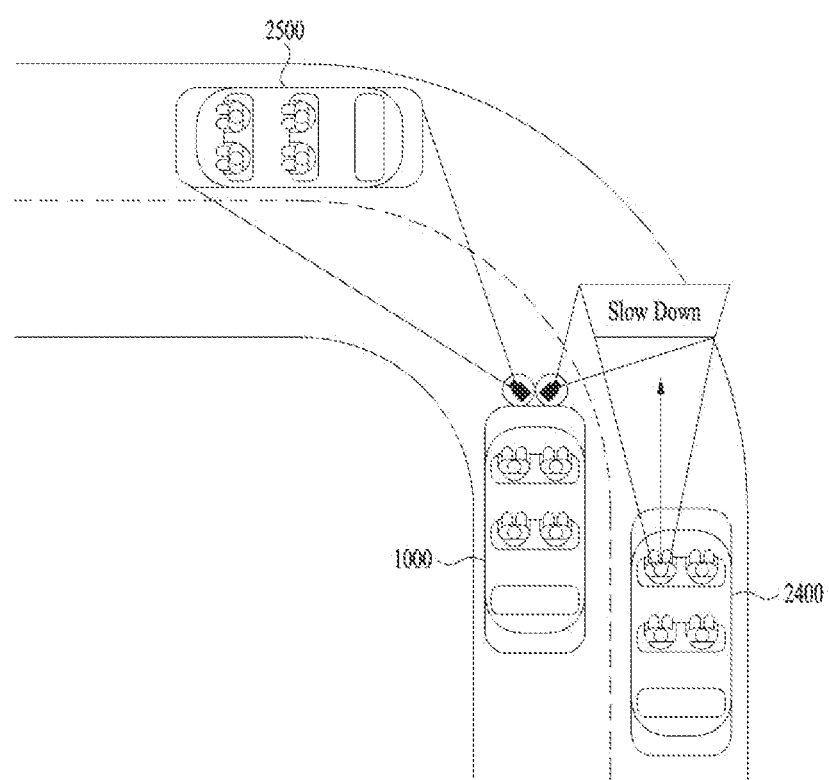

FIGS. 13 and 14 are views for illustrating a method for displaying a warning message for a laterally following vehicle of a method for displaying an external communication message for each target via a projector according to an embodiment of the present disclosure.

Referring to FIG. 13, when sensing the laterally following vehicle 2400, the vehicle 1000 may determine the distance from the laterally following vehicle 2400 and the speed of the laterally following vehicle 2400.

The vehicle 1000 may calculate the degree of distortion of the image based on the information on the state/curvature of the surface of the road ahead of the opposite vehicle 2300 and a passenger's viewing angle of the laterally following vehicle 2400. The vehicle 1000 may correct and scan the warning message for the laterally following vehicle 2400. The warning message for the laterally following vehicle 2400 may contain text 'Lane Change' of the white color on a green background.

Referring to FIG. 14, it is a situation in which a road on which the vehicle 1000 is traveling is a corner, and a laterally preceding vehicle 2500 and the laterally following vehicle 2400 exist on a road next to the road of the vehicle 1000.

The vehicle 1000 may determine a situation of the laterally preceding vehicle 2500 via the sensing means 200 and the communication means 100. The vehicle 1000 may determine a risk factor based on a traveling state of the laterally preceding vehicle 2500 (whether the vehicle 2500 is stopped/has an accident/is traveling at a low speed.

When sensing the risk factor of the laterally preceding vehicle 2500, the vehicle 1000 may determine whether the laterally following vehicle 2400 exists.

When there is the laterally following vehicle 2400, the vehicle 1000 may calculate the degree of distortion of the image based on the information on the state/curvature of the surface of the road ahead of the laterally following vehicle 2400 and the passenger's viewing angle of the laterally following vehicle 2400. The vehicle 1000 may correct and scan the warning message for the laterally following vehicle 2400. The warning message for the laterally following vehicle may contain text 'Slow Down' of the white color on the red background.

Figure 15:
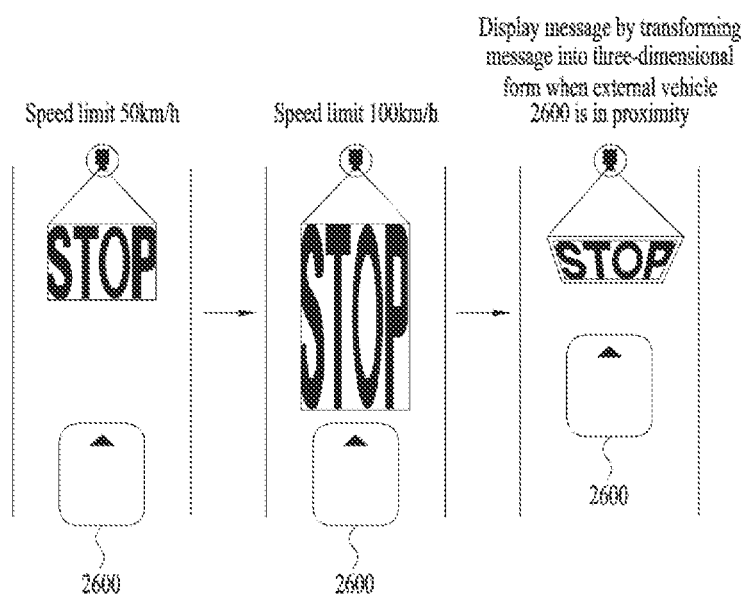
FIG. 15 is a view for illustrating a method for displaying a message based on a travel speed according to an embodiment of the present disclosure.

FIG. 15 is a view for illustrating a method for displaying a message based on a travel speed according to an embodiment of the present disclosure.

Referring to FIG. 15, the vehicle 1000 may change a form of scanning a message for safe driving corresponding to a speed limit of an external vehicle 2600. The vehicle 1000 may minimize forward gaze obstruction by displaying the message on the road surface via the change in the message scanning form.

The vehicle 1000 may display the message in a different ratio for each travel speed.

For example, when a speed of the external vehicle 2600 is 50 km/h, the vehicle 1000 may display the message such that a horizontal and vertical ratio of characters in the message to be scanned is 1:4.

For example, when a speed of the external vehicle 2600 is 100 km/h, the vehicle 1000 may display the message such that the horizontal and vertical ratio of the characters in the message to be scanned is 1:10.

In addition, the vehicle 1000 may display the message by transforming the message into a three-dimensional form by determining a high-risk situation when the external vehicle 2600 is in proximity.

Figure 16:
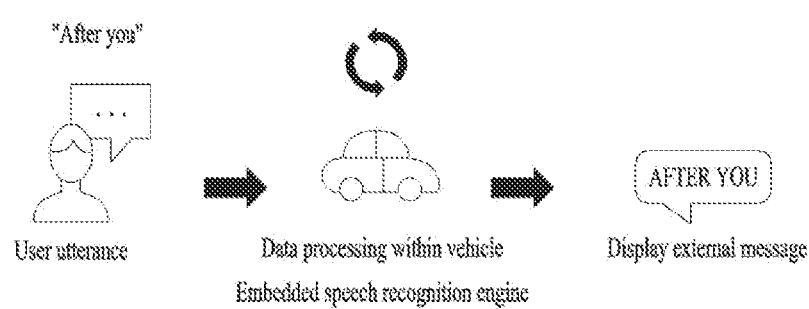
FIG. 16 is a view for illustrating a method for displaying a message of passenger utterance according to an embodiment of the present disclosure.

FIG. 16 is a view for illustrating a method for displaying a message of passenger utterance according to an embodiment of the present disclosure.

A user of the vehicle 1000 may scan an external message to a region outside the vehicle 1000 by giving a voice order within the vehicle 1000 via utterance.

To this end, the vehicle 1000 may recognize the corresponding voice order by determining an external environment of the vehicle 1000 and a pedestrian situation without a wake-up word. Thereafter, the vehicle 1000 may perform data processing via a speech engine.

For example, in a communication shadow area, an embedded speech recognition engine within the vehicle 1000 may be used as the speech engine.

For example, in a place where a communication environment is established, a cloud speech recognition engine may be used as the speech engine. When the cloud speech recognition engine is used, a DB thereof may be periodically updated via a server. Therefore, in a case of profanity, a message display restriction or a purified phrase may be displayed.

The vehicle 1000 may display the data-processed external message. For example, when the user utters "after you", the vehicle 1000 may display "AFTER YOU" as the external message.

Figure 17:
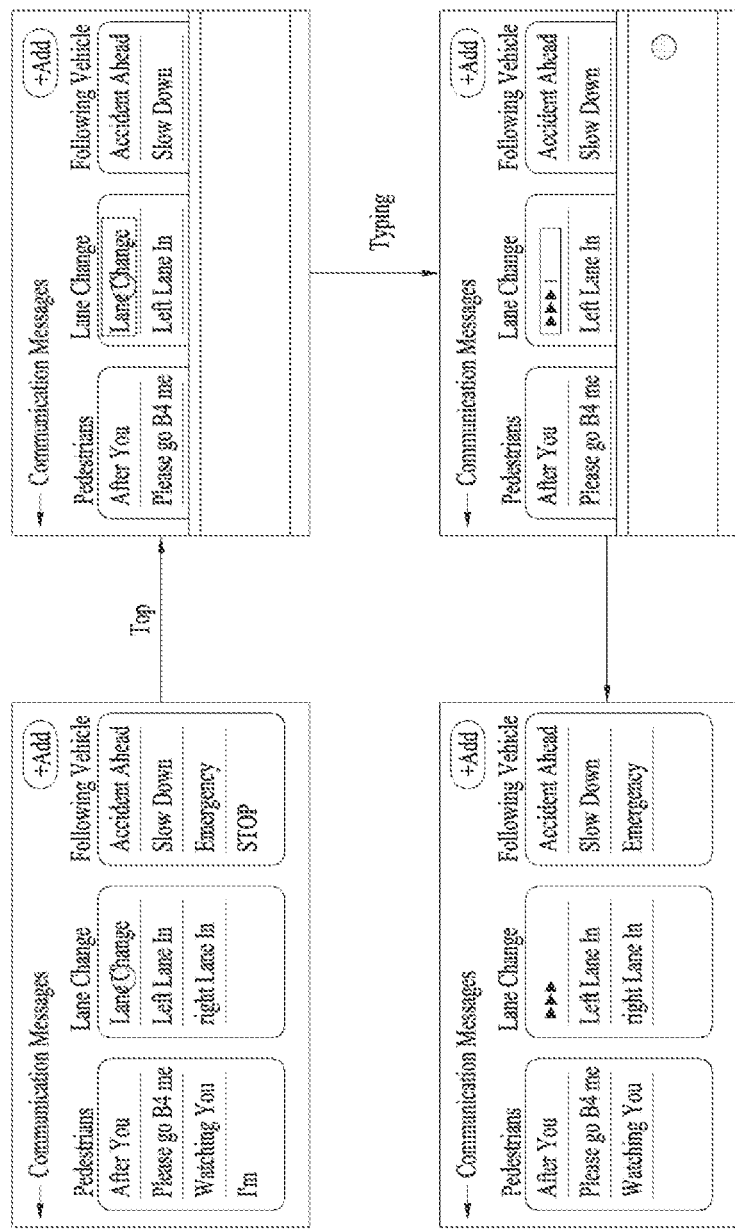
FIG. 17 is a view for illustrating a method for displaying a message of passenger utterance according to an embodiment of the present disclosure.

FIG. 17 is a view for illustrating a method for displaying a message of passenger utterance according to an embodiment of the present disclosure.

The vehicle 1000 may determine each situation and automatically display a phrase corresponding to the situation.

The message displayed by the vehicle 1000 to the outside may provide an interface in which the phrase displayed in each situation is pre-provided and is able to be changed by the user within the vehicle 1000 or via a smartphone.

When activating an external communication phrase setting menu of an AVN of the vehicle 1000 or a smart phone, a list of phrases for the respective situations and for the respective targets may be displayed.

An external communication message menu may display messages corresponding to situations of "Pedestrians", "Lane Change", and "Following Vehicle". In the Pedestrians menu, "after you", "Please go B4 me", "Watching You", and "I'm" may be displayed. In the Lane Change menu, "Lane Change", "Left Lane In", and "Right Lane In" may be displayed. In the Following Vehicle menu, "Accident Ahead", "Slow Down", "Emergency", and "STOP" may be displayed.

When selecting a phrase from the external communication message menu, a corresponding text editing screen may be activated.

When the "Lane Change" is selected in the Lane Change menu, the phrase may be edited. When the profanity is input, an input impossible guide may be displayed. Thereafter, a change of the phrase to a text input for the editing [▶▶▶] may be completed.

Figure 18:
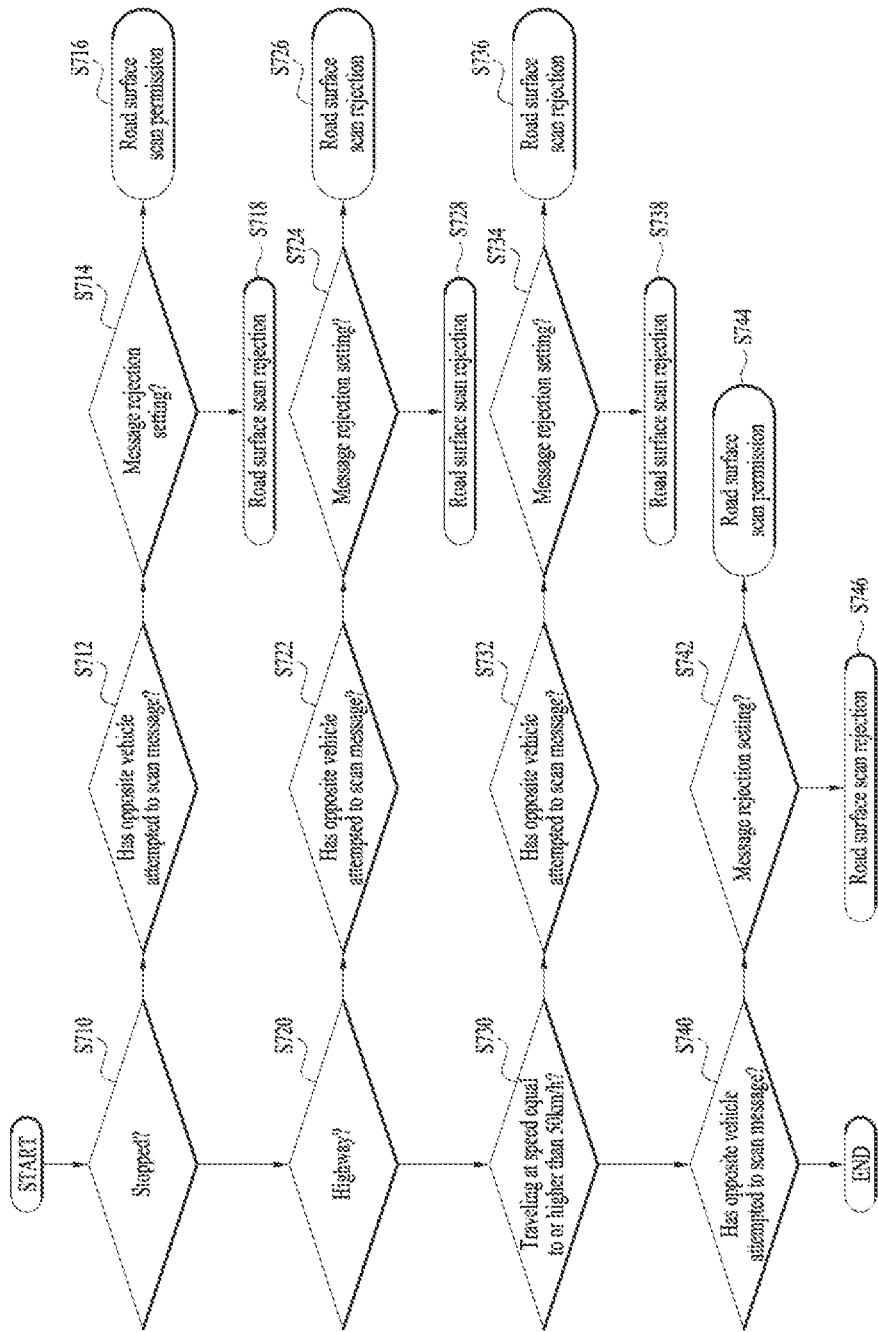
FIG. 18 is a flowchart of a method for rejecting display of an external communication message for each target via a projector according to an embodiment of the present disclosure.

FIG. 18 is a flowchart of a method for rejecting display of an external communication message for each target via a projector according to an embodiment of the present disclosure.

Referring to FIG. 18, the controller 300 may determine whether the vehicle 1000 is in the stopped state (S710).

After the step S710, when the vehicle 1000 is stopped, the controller 300 may determine an attempt to scan the message of the opposite vehicle (S712). When the opposite vehicle attempts to scan the message, the controller 300 may determine whether the vehicle 1000 is in a message rejection setting state (S714).

After the step S714, when the vehicle 1000 is not in the message rejection setting state, the controller 300 may transmit a road surface scan permission signal to the opposite vehicle via the communication means 100 (S716).

After the step S714, when the vehicle 1000 is in the message rejection setting state, the controller 300 may transmit a road surface scan rejection signal to the opposite vehicle via the communication means 100 (S718).

After the step S710, when the vehicle 1000 is not in the stopped state, the controller 300 may determine whether the vehicle 1000 is in a highway traveling state (S720).

After the step S720, when the vehicle 1000 is in the highway traveling state, the controller 300 may determine the attempt to scan the message of the opposite vehicle (S722). When the opposite vehicle attempts to scan the message, the controller 300 may determine whether the vehicle 1000 is in the message rejection setting state (S724).

After the step S724, when the vehicle 1000 is not in the message rejection setting state, the controller 300 may transmit the road surface scan rejection signal to the opposite vehicle via the communication means 100 (S726).

After the step S724, when the vehicle 1000 is in the message rejection setting state, the controller 300 may transmit the road scan permission signal to the opposite vehicle via the communication means 100 (S728).

After the step S720, when the vehicle 1000 is not in the highway traveling state, the controller 300 may determine whether the vehicle is traveling at a speed equal to or higher than a first threshold speed. In this regard, the first threshold speed may be 50 km/h (S730).

After the step S730, when the vehicle 1000 is traveling at the speed equal to or higher than the first threshold speed, the controller 300 may determine the attempt to scan the message of the opposite vehicle (S732). When the opposite vehicle attempts to scan the message, the controller 300 may determine whether the vehicle 1000 is in the message rejection setting state (S734).

After the step S734, when the vehicle 1000 is not in the message rejection setting state, the controller 300 may transmit the road surface scan rejection signal to the opposite vehicle via the communication means 100 (S736).

After the step S734, when the vehicle 1000 is in the message rejection setting state, the controller 300 may transmit the road scan permission signal to the opposite vehicle via the communication means 100 (S738).

After the step S730, when the vehicle 1000 is not traveling at the speed equal to or higher than the first threshold speed, the controller 300 may determine the attempt to scan the message of the opposite vehicle (S740).

After the step S740, when the other vehicle attempts to scan the message, the controller 300 may determine whether the vehicle 1000 is in the message rejection setting state (S742).

After the step S742, when the vehicle 1000 is not in the message rejection setting state, the controller 300 may transmit the road scan permission signal to the opposite vehicle via the communication means 100 (S744).

After the step S742, when the vehicle 1000 is in the message rejection setting state, the controller 300 may transmit the road scan rejection signal to the opposite vehicle via the communication means 100 (S746).

As another aspect of the present disclosure, the operation of the proposal or the invention described above may also be provided as a code that may be implemented, embodied, or executed by a "computer" (a comprehensive concept including a system on chip (SoC) or a microprocessor), an application storing or containing the code, a computer-readable storage medium, a computer program product, or the like, and this also falls within the scope of the present disclosure.

The detailed descriptions of the preferred embodiments of the present disclosure disclosed as described above have been provided to enable those skilled in the art to implement and practice the present disclosure. Although the description has been made with reference to the preferred embodiments of the present disclosure, those skilled in the art will understand that the present disclosure may be variously modified and changed without departing from the scope of the present disclosure. For example, those skilled in the art may use the components described in the above-described embodiments in a scheme of combining the components with each other.

Accordingly, the present disclosure is not intended to be limited to the embodiments illustrated herein, but is to be accorded the widest scope consistent with the principles and novel features disclosed herein.

What is claimed is:

1. A method for displaying an external communication message, comprising:
   determining, based on environmental information indicative of an external object in a surrounding of a vehicle, whether a situation for displaying an external communication message has occurred;
   in response to determining that the situation has occurred, generating an image of the external communication message to be projected externally of the vehicle to be seen by a person;
   determining distortion applicable to the image for improving readability of the external communication message when the image is projected externally of the vehicle and seen by the person;
   adjusting, based on the determined distortion, the generated image of the external communication message; and
   projecting the adjusted image of the external communication message externally of the vehicle to be seen by the person.

2. The method of claim 1, wherein determining whether the situation for displaying the external communication message has occurred includes:
   determining, based on the environmental information, whether the external object is one of a target and an external vehicle; and
   in response to determining that the external object is one of the target and external vehicle, determining that the situation for displaying the external communication message has occurred.

3. The method of claim 2, wherein determining whether the situation for displaying the external communication message has occurred includes:
   determining whether the external object is the target; and
   in response to determining that the external object is the target, determining whether the situation is one of (1) a first situation that the external object is a scanning surface in front of the vehicle and (2) a second situation that the external object is a pedestrian.

4. The method of claim 3, wherein, in response to determining that the situation is the first situation, determining the distortion applicable to the image for improving readability of the external communication message when the image is projected externally of the vehicle and seen by the person includes:
   measuring a distance and an angle between the scanning surface and the vehicle;
   determining a vehicle passenger's viewing angle;
   determining a state of the scanning surface; and
   determining, based on the measured distance and angle between the scanning surface and the vehicle, the vehicle passenger's viewing angle, and the state of the scanning surface, the distortion applicable to the image.

5. The method of claim 3, wherein, in response to determining that the situation is the second situation, determining the distortion applicable to the image for improving readability of the external communication message when the image is projected externally of the vehicle and seen by the person includes:
   determining a state of the pedestrian based on a direction in which a head or face of the pedestrian is facing;
   determining a state of a road surface at which the external communication message is to be displayed; and
   determining, based on the states of the pedestrian and road surface, the distortion applicable to the image.

6. The method of claim 2, wherein determining whether the situation for displaying the external communication message has occurred includes:
   determining whether the external object is the external vehicle; and
   in response to determining that the external object is the external vehicle, determining that whether the situation is one of (1) a first situation that a high beam of the external vehicle is turned on, (2) a second situation that the external vehicle is following the vehicle from behind, and (3) a third situation that the external vehicle is laterally following the vehicle.

7. The method of claim 6, wherein, in response to determining that the situation is the first situation, determining the distortion applicable to the image for improving readability of the external communication message when the image is projected externally of the vehicle and seen by the person includes:
 determining a distance from and a speed of the external vehicle;
 determining a state of a road surface on which the external communication message is to be displayed;
 determining an eye level of a driver of the external vehicle; and
 determining, based on the distance from and speed of the external vehicle, the state of the road surface, and the eye level of the driver of the external vehicle, the distortion applicable to the image.

8. The method of claim 6, wherein, in response to determining that the situation is the third situation, determining the distortion to the image that improves readability of the external communication message when the image is projected externally of the vehicle and seen by the person includes:
 determining a distance from and a speed of the external vehicle laterally following the vehicle;
 determining a state of a road surface on which the external communication message is to be displayed;
 determining a viewing angle of a driver of the external vehicle; and
 determining, based on the distance from and speed of the external vehicle, the state of the road surface, and the viewing angle of the driver of the external vehicle, the distortion appliable to the image.

9. The method of claim 6, wherein, in response to determining that the situation is the second situation, determining the distortion applicable to the image for improving readability of the external communication message when the image is projected externally of the vehicle and seen by the person includes:
 determining a distance from and a speed of the external vehicle following the vehicle from behind;
 determining a state of a road surface on which the external communication message is to be displayed;
 determining a viewing angle of a driver of the external vehicle; and
 determining, based on the distance from and speed of the external vehicle, the state of the road surface, and the viewing angle of the driver of the external vehicle, the distortion applicable to the image.

10. A system for displaying an external communication message, comprising:
 a communication unit including a Vehicle-To-Everything (V2X) communication unit configured to perform V2V communication;
 a sensing unit configured to generate environmental information of a surrounding of a vehicle and including (1) a camera assembly configured to capture the surrounding of the vehicle and (2) an object detecting unit configured to detect an external object in the surrounding of the vehicle;
 a projector; and
 a controller configured to:
  determine, based on the environmental information, whether a situation for displaying the external communication message has occurred;
  in response to determining that the situation has occurred, generate an image of the external communication message to be projected externally of the vehicle to be seen by a person;
  determine distortion applicable to the image for improving readability of the external communication message when the image is projected externally of the vehicle and seen by the person;
  adjust, based on the determined distortion, the generated image of the external communication message; and
  control the projector to project the adjusted image of the external communication message.

11. The system of claim 10, wherein, to determine whether the situation has occurred, the controller is configured to:
 determine, based on the environmental information, whether the detected external object is one of a target and an external vehicle; and
 in response to determining that the detected external object is one of the target and external vehicle, determine that the situation has occurred.

12. The system of claim 11, wherein, in response to determining that the detected external object is the target, the controller is configured to determine whether the situation is one of:
 a first situation that the target is a scanning surface in front of the vehicle; and
 a second situation that the target is a pedestrian.

13. The system of claim 12, wherein, to determine the distortion applicable to the image for improving readability of the external communication message when the image is projected externally of the vehicle and seen by the person, the controller is configured, in response to determining that the situation is the first situation, to:
 measure a distance and an angle between the scanning surface and the vehicle;
 determine a vehicle passenger's viewing angle;
 determine a state of the scanning surface in front of the vehicle; and
 determine, based on the distance and angle between the scanning surface and the vehicle, the vehicle passenger's viewing angle, and the state of the scanning surface, the distortion applicable to the image.

14. The system of claim 12, wherein, to determine the distortion applicable to the image for improving readability of the external communication message when the image is projected externally of the vehicle and seen by the person, the controller is configured, in response to determining that the situation is the second situation, to:
 determine a state of the pedestrian based on a direction in which a head or face of the pedestrian is facing;
 determine a state of a road surface on which the external communication message is to be displayed; and
 determine, based on the states of the pedestrian and road surface, the distortion appliable to the image.

15. The system of claim 12, wherein, in response to determining that the detected external object is the external vehicle, the controller is configured to determine whether the situation is one of:
 a first situation that a high beam of the external vehicle is turned on,
 a second situation that the external vehicle is following the vehicle from behind, and
 a third situation that the external vehicle is laterally following the vehicle.

16. The system of claim 15, wherein, to determine the distortion applicable to the image for improving readability of the external communication message when the image is projected externally of the vehicle and seen by the person, the controller is configured, in response to determining that the situation is the first situation, to:
- determine a distance from and a speed of the external vehicle;
- determine a state of a road surface on which the external communication message is to be displayed;
- determine an eye level of a driver of the external vehicle; and
- determine, based on the distance from and speed of the external vehicle, the state of the road surface, and the eye level of the driver of the external vehicle, the distortion applicable to the image.

17. The system of claim 15, wherein, to determine the distortion applicable to the image for improving readability of the external communication message when the image is projected externally of the vehicle and seen by the person, the controller is configured, in response to determining that the situation is the third situation, to:
- determine a distance from and a speed of the external vehicle laterally following the vehicle;
- determine a state of a road surface on which the external communication message is to be displayed;
- determine a viewing angle of a driver of the external vehicle; and
- determine, based on the distance from and speed of the external vehicle, the state of the road surface and the viewing angle of the driver of the external vehicle, the distortion applicable to the image.

18. The system of claim 15, wherein, to determine the distortion applicable to the image for improving readability of the external communication message when the image is projected externally of the vehicle and seen by the person, the controller is configured, in response to determining that the situation is the second situation, to:
- determine a distance from and a speed of the external vehicle following the vehicle from behind;
- determine a state of a road surface on which the external communication message is to be displayed;
- determine a viewing angle of a driver of the external vehicle; and
- determine, based on the distance from and speed of the external vehicle, the state of the road surface, and the viewing angle of the driver of the external vehicle, the distortion applicable to the image.

19. A vehicle comprising:
- a sensing unit comprising (1) a camera assembly including a plurality of cameras and (2) an object detecting unit including at least one of a radar and a LiDAR and configured to detect an object in a surrounding of the vehicle;
- a projector configured to project an image of an external communication message externally of the vehicle to be seen by a person; and
- an external communication message displaying system configured to:
  - determine, based on the object detected by the sensing unit, whether a situation for displaying the external communication message display has occurred;
  - in response to determining that the situation has occurred, generate the image of the external communication message;
  - determine distortion applicable to the image for improving readability of the external communication message when the image is projected externally of the vehicle and seen by the person;
  - adjust, based on the determined distortion, the generated image of the external communication message; and
  - control the projector to project the adjusted image of the external communication message externally of the vehicle to be seen by the person.

* * * * *